(12) United States Patent
Ohta et al.

(10) Patent No.: US 12,539,942 B2
(45) Date of Patent: Feb. 3, 2026

(54) FLOATING BODY FOR OFFSHORE WIND TURBINE

(71) Applicant: MITSUBISHI SHIPBUILDING CO., LTD., Yokohama (JP)

(72) Inventors: Makoto Ohta, Tokyo (JP); Kai Karikomi, Tokyo (JP); Masao Komatsu, Yokohama (JP); Shin Terada, Yokohama (JP); Shingen Takeda, Yokohama (JP); Noriyuki Manabe, Yokohama (JP); Shin Nakayama, Yokohama (JP)

(73) Assignee: MITSUBISHI SHIPBUILDING CO., LTD., Yokohama (JP)

( * ) Notice: Subject to any disclaimer, the term of this patent is extended or adjusted under 35 U.S.C. 154(b) by 496 days.

(21) Appl. No.: 18/012,721

(22) PCT Filed: Jun. 29, 2021

(86) PCT No.: PCT/JP2021/024449
§ 371 (c)(1),
(2) Date: Dec. 23, 2022

(87) PCT Pub. No.: WO2022/004690
PCT Pub. Date: Jan. 6, 2022

(65) Prior Publication Data
US 2023/0257072 A1  Aug. 17, 2023

(30) Foreign Application Priority Data
Jun. 30, 2020 (JP) .................................. 2020-113070

(51) Int. Cl.
*B63B 1/12* (2006.01)
*B63B 35/44* (2006.01)
(Continued)

(52) U.S. Cl.
CPC .............. *B63B 1/121* (2013.01); *B63B 35/44* (2013.01); *B63B 39/02* (2013.01); *F03D 13/25* (2016.05);
(Continued)

(58) Field of Classification Search
CPC ..... F03D 13/25; B63B 1/12; B63B 2035/446; B63B 39/02; B63B 35/00; F05B 2240/93; F05B 2240/95
See application file for complete search history.

(56) References Cited

U.S. PATENT DOCUMENTS

2009/0229505 A1  9/2009 Williams et al.
2011/0139056 A1  6/2011 Cholley et al.
(Continued)

FOREIGN PATENT DOCUMENTS

CN  104081045 A  10/2014
EP  2789847 A1  10/2014
(Continued)

OTHER PUBLICATIONS

Chinese First Office Action for Chinese Application No. 202180034025.1 issued on Feb. 25, 2025; 16 pp.
(Continued)

*Primary Examiner* — Timothy D Collins
(74) *Attorney, Agent, or Firm* — HAUPTMAN HAM, LLP

(57) ABSTRACT

A floating body for an offshore wind turbine includes: one first column; two second columns; two lower hulls connecting the first column to each of the second columns; and a beam member connecting the two lower hulls. The beam member is disposed within a height range between an upper surface and a lower surface of each lower hull.

22 Claims, 12 Drawing Sheets

(51) Int. Cl.
 B63B 39/02 (2006.01)
 F03D 13/25 (2016.01)
(52) U.S. Cl.
 CPC ..... *B63B 2035/446* (2013.01); *F05B 2240/93* (2013.01); *F05B 2240/95* (2013.01)

(56) References Cited

U.S. PATENT DOCUMENTS

| | | | |
|---|---|---|---|
| 2012/0121340 A1 | 5/2012 | Pao | |
| 2014/0305359 A1 | 10/2014 | Lambrakos et al. | |

FOREIGN PATENT DOCUMENTS

| | | | | | |
|---|---|---|---|---|---|
| EP | 2789849 | A1 | 10/2014 | | |
| ES | 2644169 | A1 | 11/2017 | | |
| JP | 2004-019470 | * | 1/2004 | ............... | F03D 9/00 |
| JP | 2004-019470 | A | 1/2004 | | |
| JP | 2010-539378 | A | 12/2010 | | |
| JP | 2011-521820 | A | 7/2011 | | |
| JP | 2011-525223 | A | 9/2011 | | |
| JP | 5758501 | B2 | 8/2015 | | |
| JP | 2018-519205 | A | 7/2018 | | |
| JP | 2019-217801 | A | 12/2019 | | |
| WO | 2009/131826 | A2 | 10/2009 | | |
| WO | 2011/137903 | A2 | 11/2011 | | |
| WO | 2013/084632 | A1 | 6/2013 | | |
| WO | 2013/084633 | A1 | 6/2013 | | |
| WO | 2013/084856 | A1 | 6/2013 | | |
| WO | 2013/084878 | * | 6/2013 | ............... | F03D 9/00 |
| WO | 2013/084878 | A1 | 6/2013 | | |
| WO | 2016/205746 | A1 | 12/2016 | | |

OTHER PUBLICATIONS

Office Action for Korean Application Number No. 10-2022-7036614 mailed Jun. 19, 2024; 13Pp.
PCT/ISA/210, "International Search Report for PCT International Application No. PCT/JP2021/024449," Sep. 21, 2021.
PCT/ISA/237 and PCT/IB/373, "Written Opinion with International Preliminary Report on Patentability for PCT International Application No. PCT/JP2021/024449," Jan. 12, 2023.
European Patent Office, "Extended European Search Report with Search Opinion for European Patent Application No. 21833796.2," Nov. 10, 2023.

* cited by examiner

FLOATING BODY FOR OFFSHORE WIND TURBINE

TECHNICAL FIELD

The present disclosure relates to a floating body for an offshore wind turbine.

The present application claims priority based on Japanese Patent Application No. 2020-113070 filed on Jun. 30, 2020, the entire content of which is incorporated herein by reference.

BACKGROUND ART

An offshore wind turbine includes a wind turbine power generating apparatus and a floating body that supports the wind turbine power generating apparatus on the sea. As an example of such a floating body, Patent Document 1 discloses a floating body comprising three columns, two hollow lower hulls connecting two of the three columns, and a beam member connecting the two lower hulls.

CITATION LIST

Patent Literature

Patent Document 1: WO2013/084856A

SUMMARY

Problems to be Solved

The beam member connecting the two lower hulls functions as a reinforcing member to reduce stress concentration on a specific portion of the floating body (lower hull base where the two lower hulls are connected to each other). However, when a beam member is provided on the floating body, the beam member is affected by tidal currents and ocean currents and generates a drag force acting in the horizontal direction. The drag force generated by the beam member is desired to be as small as possible in terms of reducing the tidal current load acting on the floating body.

The present disclosure was made in view of the above problem, and an object thereof is to provide a floating body for an offshore wind turbine including a beam member capable of reducing a drag force generated by the influence of tidal currents and ocean currents while functioning as a reinforcing member.

Solution to the Problems

To achieve the above object, a floating body for an offshore wind turbine according to the present disclosure includes: one first column; two second columns; two lower hulls connecting the first column to each of the second columns; and a beam member connecting the two lower hulls. The beam member is disposed within a height range between an upper surface and a lower surface of each lower hull.

Advantageous Effects

A floating body for an offshore wind turbine according to the present disclosure includes a beam member capable of reducing a drag force generated by the influence of tidal currents and ocean currents while functioning as a reinforcing member.

DETAILED DESCRIPTION

Hereinafter, a floating body for an offshore wind turbine according to embodiments of the present disclosure will be described with reference to the drawings. The following embodiments are illustrative and not intended to limit the present disclosure, and various modifications are possible within the scope of technical ideas of the present disclosure.

Configuration of Offshore Wind Turbine

Figure 1:
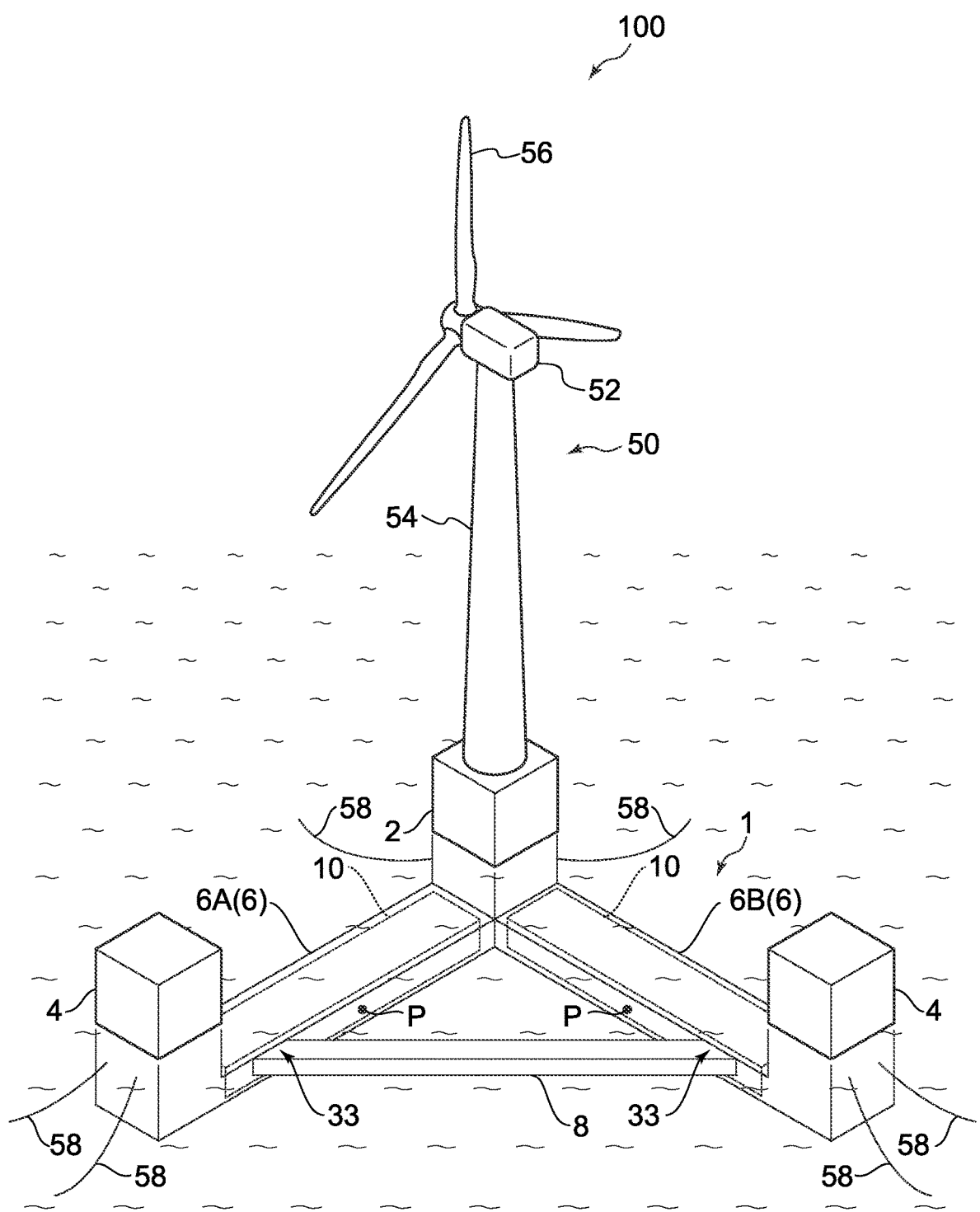
FIG. 1 is a perspective view showing a configuration of an offshore wind turbine according to an embodiment.

FIG. 1 is a perspective view showing a configuration of an offshore wind turbine 100 according to an embodiment. As shown in FIG. 1, the offshore wind turbine 100 includes a wind turbine power generating apparatus 50 and a floating body 1 that supports the wind turbine power generating apparatus 50 on the sea.

The wind turbine power generating apparatus 50 includes a nacelle 52, a tower 54 supporting the nacelle 52 from below, and a rotor 56 rotatably mounted to the nacelle 52. The nacelle 52 is pivotally mounted to the tower 54 via a yaw slewing bearing to orient the rotor 56 according to a wind direction. In the embodiment illustrated in FIG. 1, the wind turbine power generating apparatus 50 is an upwind wind turbine in which the nacelle 52 is controlled to rotate so that the rotor 56 is positioned on the upwind side. In another embodiment, the wind turbine power generating apparatus 50 may be a downwind wind turbine in which the nacelle 52 is controlled to rotate so that the rotor 56 is positioned on the downwind side. The rotor 56 is rotated by the wind, and the rotational energy of the rotor 56 is converted into electric power by a generator (not shown).

Configuration of Floating Body

As shown in FIG. 1, the floating body 1 includes one first column 2, two second columns 4, two lower hulls 6 connecting the first column 2 to each of the second columns 4, and a beam member 8 connecting the two lower hulls 6. Such a floating body 1 has a substantially A shape in plan view.

The one first column 2 and the two second columns 4 form each vertex of an imaginary isosceles triangle in plan view. The first column 2 is positioned at the apex of the plan view imaginary isosceles triangle formed by the one first column 2 and the two second columns 4. In the embodiment illustrated in FIG. 1, the one first column 2 is equipped with the wind turbine power generating apparatus 50 and corresponds to a primary column. On the other hand, the two second columns 4 are not equipped with the wind turbine power generating apparatus 50 and correspond to secondary columns. Each of the one first column 2 and the two second columns 4 is connected to a mooring line 58 connected to an anchor fixed to the seabed.

As shown in FIG. 1, the first lower hull 6A (6) is arranged along one of the two equal sides of the plan view imaginary isosceles triangle, and the second lower hull 6B (6) is arranged along the other of the two equal sides of the plan view imaginary isosceles triangle. The apex of the plan view imaginary isosceles triangle formed by the one first column 2 and the two second columns 4 is set within, but is not limited to, an angle range in consideration of the stability of the floating body 1, for example, 90 degrees.

Figure 14:
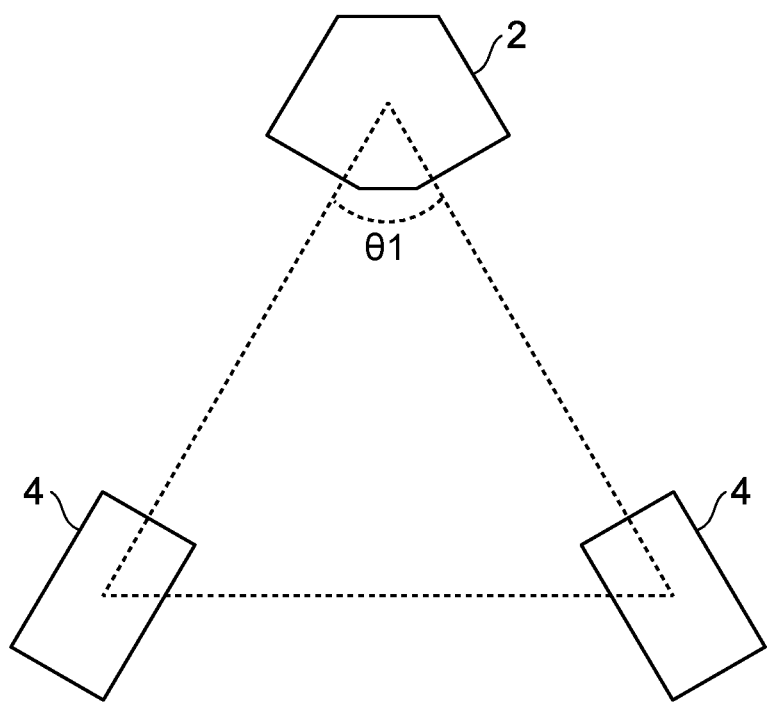
FIG. 14 is an explanatory diagram for describing the positions of one first column and two second columns according to an embodiment.

FIG. 14 is an explanatory diagram for describing the positions of the one first column 2 and the two second columns 4 according to an embodiment. FIG. 14 shows the positions of the one first column 2 and the two second columns 4 in plan view of the floating body 1. In the embodiment illustrated in FIG. 14, the one first column 2 and the two second columns 4 form each vertex of an imaginary isosceles triangle with the first column 2 corresponding to the apex angle $\theta 1$ in plan view. The apex angle $\theta 1$ is 50 degrees or more and 70 degrees or less. More preferably, the apex angle $\theta 1$ is 55 degrees or more and 65 degrees or less. In the embodiment illustrated in FIG. 14, the apex angle $\theta 1$ is 60 degrees so that the imaginary isosceles triangle is an equilateral triangle. In FIG. 14, each vertex of the imaginary isosceles triangle is located at the center of the first column 2 or the second column 4 (the present disclosure is not limited to the cross-sectional shape of the first column 2 and the cross-sectional shape of the second column 4 shown in FIG. 14)

Hereinafter, the direction from the beam member 8 to the first column 2 positioned at the apex of the plan view imaginary isosceles triangle is defined as the front, and the opposite direction is defined as the rear.

Figure 12:
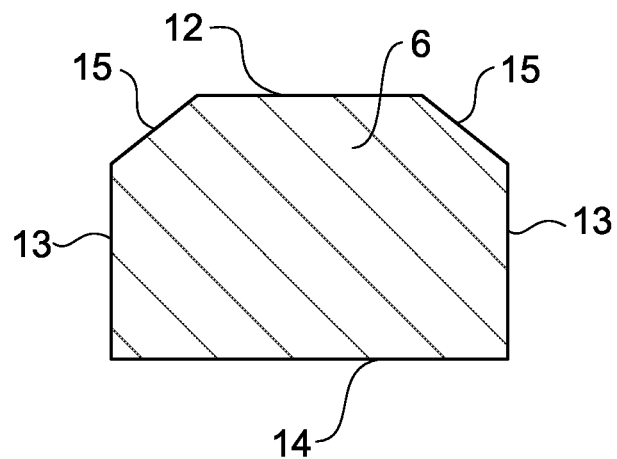
FIG. 12 is a cross-sectional view of a lower hull according to an embodiment.
Figure 13:
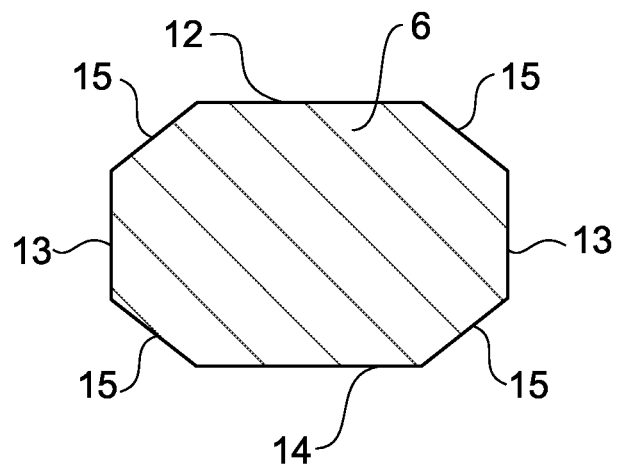
FIG. 13 is a cross-sectional view of a lower hull according to an embodiment.

The lower hull 6 has a cavity portion 10 and is configured to be submersible by injecting ballast water into the cavity portion 10. When ballast water is injected into at least the cavity portion 10, the lower hull 6 is completely submerged, with its upper surface below the waterline. In a cross-sectional view perpendicular to the extension direction of the lower hull 6, the lower hull 6 has a rectangular outer periphery. As shown in FIGS. 12 and 13, in a cross-sectional view perpendicular to the longitudinal direction of the lower hull 6, a corner portion 15 of the lower hull 6 may be chamfered. In the case of the lower hull 6 illustrated in FIG. 12, the corner portion 15 of the lower hull 6 is a portion that connects the upper surface 12 and the side surface 13 of the lower hull 6. In the case of the lower hull 6 illustrated in FIG. 13, the corner portion 15 of the lower hull 6 is a portion that connects the upper surface 12 and the side surface 13 of the lower hull 6 and a portion that connects the lower surface 14 and the side surface 13 of the lower hull 6 (in this case, the lower hull 6 has an octagonal outer periphery). Further, the ratio of the width to the height of the lower hull 6 may be constant over the entire length of the lower hull 6 or may have a distribution that varies in the extension direction of the lower hull 6.

Configuration of Beam Member

Figure 2:
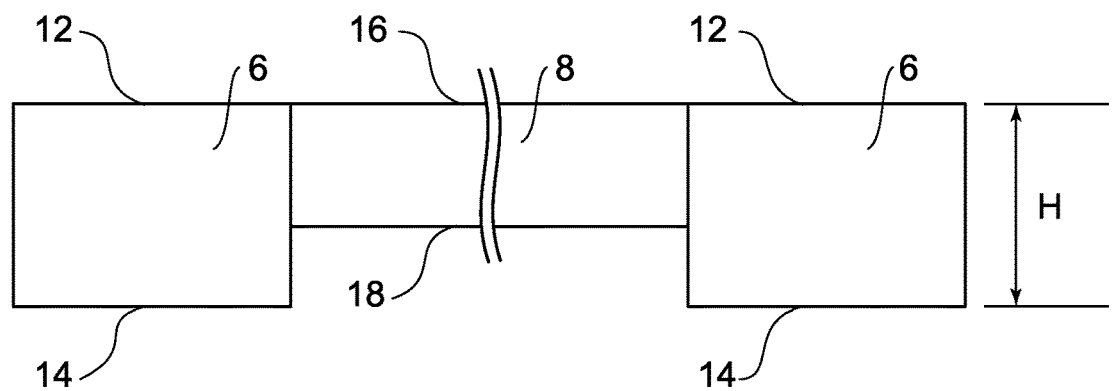
FIG. 2 is a side view of a beam member according to an embodiment.

FIG. 2 is a side view of the beam member 8 according to an embodiment. As shown in FIG. 2, the beam member 8 is disposed within a height range H between the upper surface 12 and the lower surface 14 of each lower hull 6.

In the embodiment illustrated in FIG. 2, the upper surface 16 of the beam member 8 is located at the height of the upper surface 12 of the lower hull 6. In other words, the beam member 8 is arranged so that the upper surface 16 of the beam member 8 is flush with the upper surface 12 of the lower hull 6. For example, errors based on manufacturing tolerances are allowed. The lower surface 18 of the beam member 8 is located above the lower surface 14 of the lower hull 6. Thus, by placing the beam member 8 closer to the upper surface 12 of the lower hull 6 within the height range H, the center of buoyancy of the floating body 1 is raised, allowing the floating body 1 to float on the sea in a more stable state.

The position of the beam member 8 within the height range H of the lower hull 6 is not limited to the example shown in FIG. 2.

Figure 3:
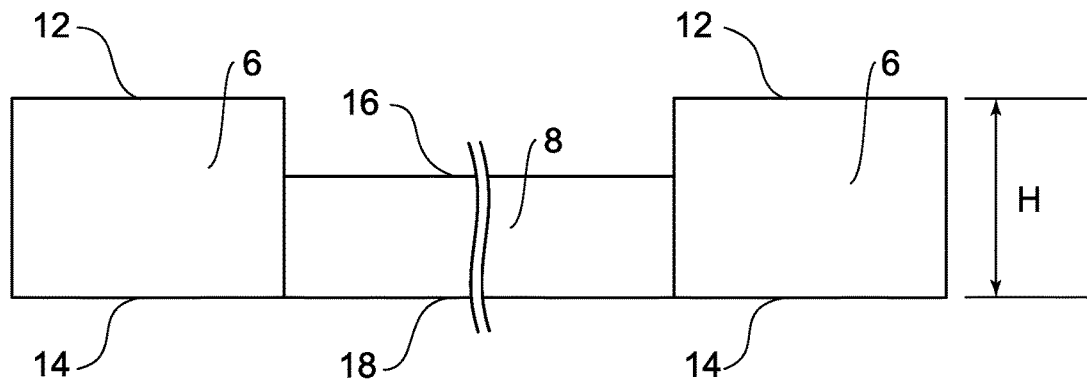
FIG. 3 is a side view of a beam member according to an embodiment.

For example, in another embodiment shown in FIG. 3, the lower surface 18 of the beam member 8 is located at the height of the lower surface 14 of the lower hull 6. In other words, the beam member 8 is arranged so that the lower surface 18 of the beam member 8 is flush with the lower surface 14 of the lower hull 6. For example, errors based on manufacturing tolerances are allowed. With the configuration of the beam member 8 illustrated in FIG. 3, the beam member 8 and the lower hull 6 can be placed on the same plane when manufacturing the floating body 1. This eliminates the need to adjust the height of the beam member 8 or the lower hull 6 with a support material such as a board, thereby reducing the manufacturing cost of the floating body 1.

Figure 4:
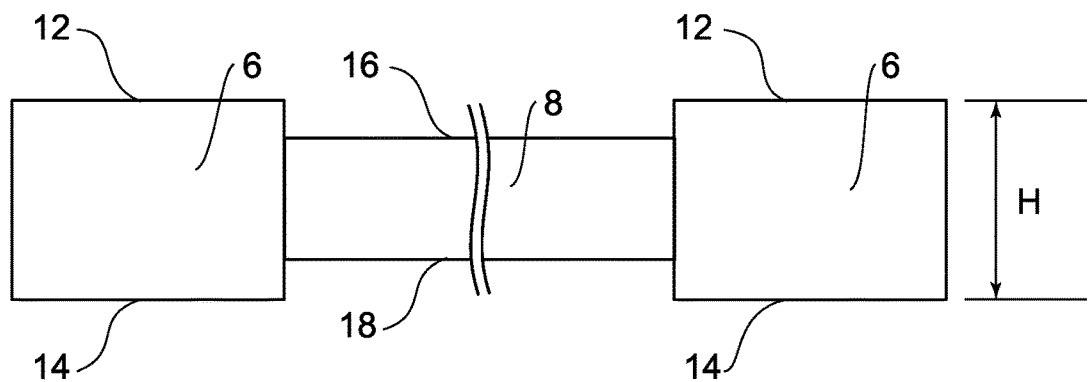
FIG. 4 is a side view of a beam member according to an embodiment.

In another embodiment shown in FIG. 4, the lower surface 18 of the beam member 8 is located above the lower surface 14 of the lower hull 6, and the upper surface 16 of the beam member 8 is located below the upper surface 12 of the lower hull 6. Further, the beam member 8 connects the two lower hulls 6 so that the upper surface 16 of the beam member 8 and the lower surface 18 of the beam member 8 are placed on opposite sides of the middle height position of the lower hull 6 (the midpoint between the upper surface 12 and the lower surface 14 of the lower hull 6). With the configuration of the beam member 8 illustrated in FIG. 4, the force acting on the beam member 8 from the lower hull 6 is distributed between the upper surface 16 and the lower surface 18 of the beam member 8 in a more balanced manner than when the beam member 8 is closer to the upper surface 12 or the lower surface 14 of the lower hull 6, so that the beam member 8 can be made more compact.

Figure 5:
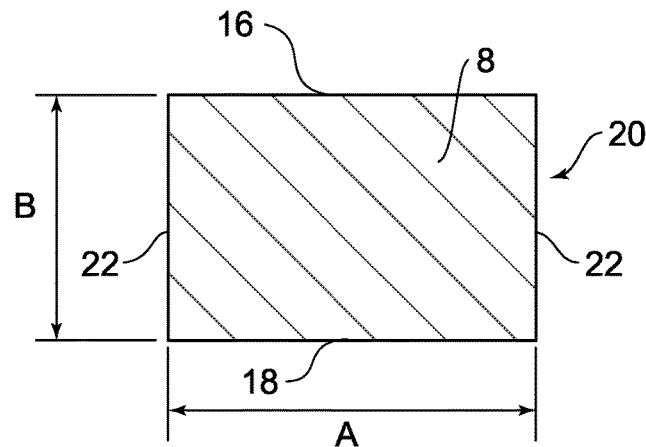
FIG. 5 is a cross-sectional view of a beam member according to an embodiment.
Figure 6:
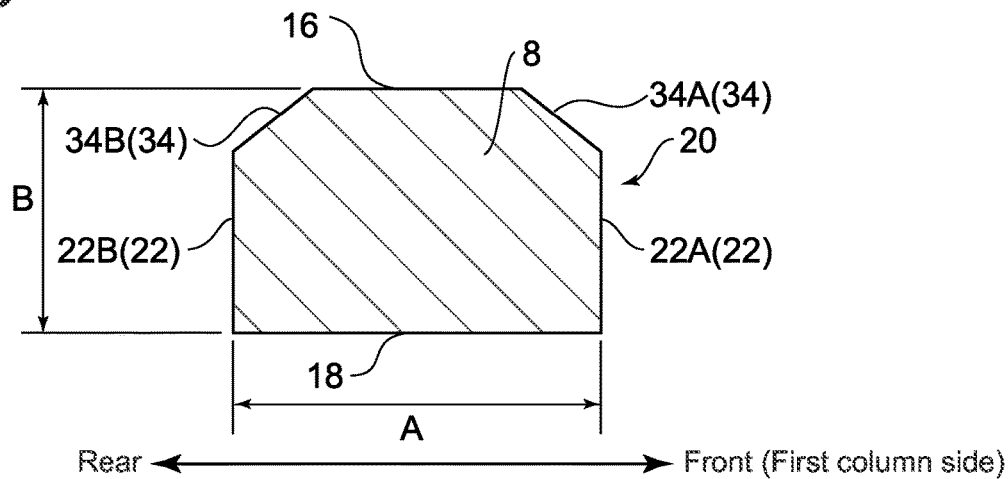
FIG. 6 is a cross-sectional view of a beam member according to an embodiment.
Figure 7:
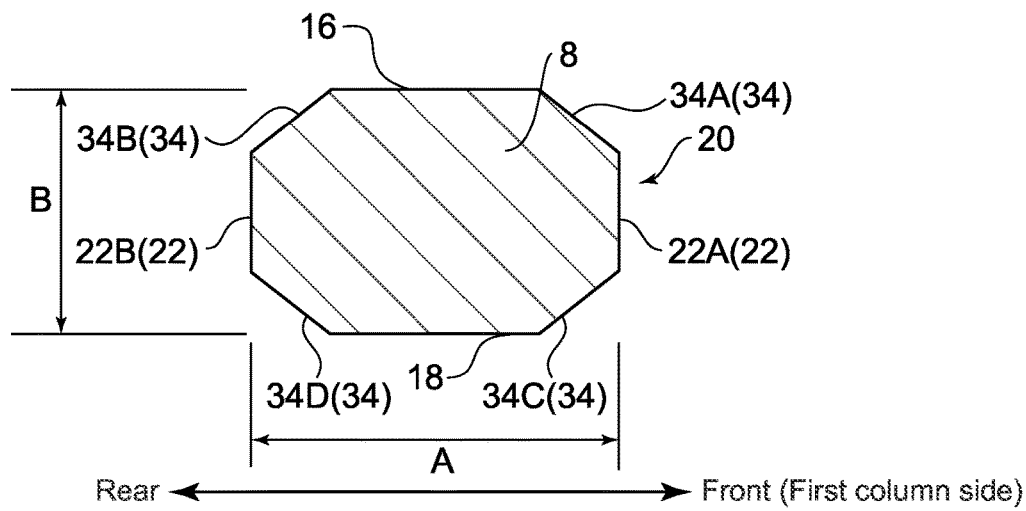
FIG. 7 is a cross-sectional view of a beam member according to an embodiment.

FIGS. 5 to 7 are cross-sectional views of the beam member 8 according to an embodiment. As shown in FIGS. 5 to 7, in a cross-section along the direction perpendicular to the extension direction of the beam member 8, the width A of the beam member 8 is larger than the height B of the beam member 8. Specifically, the ratio of the width A to the height B of the beam member 8 may be 1.1 or more and 2 or less, or may be 1.3 or more and 1.6 or less.

By adopting the beam member 8 with a cross-sectional shape in which the width is larger than the height, the areas of the lower surface 18 and the upper surface 16 of the beam member 8 are made larger than the side surfaces 22 (the front surface and the rear surface) of the beam member 8, so that the vertical drag force that the beam member 8 receives from seawater can be increased. Therefore, it is possible to further enhance the effect of reducing the oscillation of the floating body 1 by the beam member 8.

The ratio of the width to the height of the beam member 8 may be constant over the entire length of the beam member 8 or may have a distribution that varies in the extension direction of the beam member 8. For example, as shown in FIG. 1, the ratio (>1) of the width to the height of the beam member 8 may be constant over the entire length of the beam member 8 except for connecting portions 33 connected to each lower hull 6. Further, the beam member 8 may be solid, or may have an interior space.

In the embodiment illustrated in FIG. 5, in a cross-sectional view perpendicular to the extension direction of the beam member 8, the beam member 8 has a rectangular outer periphery 20. When the cross-sectional shape of the beam member 8 is rectangular, compared to a beam member having an oval (circular, elliptical, egg-shaped, oblong, etc.) cross-section at the outer periphery, it is possible to further enhance the effect of reducing the oscillation of the floating body 1. If the outer periphery 20 of the beam member 8 is oval, the drag force that the beam member 8 receives from a fluid (seawater) when the beam member 8 moves vertically is relatively small. In contrast, with the configuration of the beam member 8 illustrated in FIG. 5, since the beam member 8 has a rectangular outer periphery 20, the drag force that the beam member 8 receives from seawater is increased. Therefore, it is possible to further enhance the effect of reducing the oscillation of the floating body 1 by the beam member 8. Herein, "rectangular" refers to a shape in which the angle formed by two adjacent sides is 90 degrees. Therefore, the shape of the outer periphery 20 of the beam member 8 may be of a rectangle or square, as shown in FIG. 5.

The outer periphery 20 of the beam member 8 is not limited to a rectangular shape. In another embodiment, as shown in FIGS. 6 and 7, in a cross-sectional view perpendicular to the extension direction of the beam member 8, a corner portion 34 of the beam member 8 may be chamfered. In the present disclosure, the corner portion 34 of the beam member 8 is a portion that connects the upper surface 16 and the side surface 22 of the beam member 8 or a portion that connects the lower surface 18 and the side surface 22 of the beam member 8.

In the embodiment illustrated in FIG. 6, the corner portion 34 of the beam member 8 includes a first corner portion 34A (34) that connects the upper surface 16 and the front surface 22A of the beam member 8 and a second corner portion 34B (34) that connects the upper surface 16 and the rear surface 22B of the beam member 8. Each of the first corner portion 34A and the second corner portion 34B is a flat, non-curved surface that does not form an uneven surface.

In the embodiment illustrated in FIG. 7, in a cross-sectional view perpendicular to the extension direction of the beam member 8, the beam member 8 has an octagonal outer periphery 20. In other words, the corner portion 34 of the beam member 8 includes a first corner portion 34A (34) that connects the upper surface 16 and the front surface 22A of the beam member 8, a second corner portion 34B (34) that connects the upper surface 16 and the rear surface 22B of the beam member 8, a third corner portion 34C (34) that connects the lower surface 18 and the front surface 22A of the beam member 8, and a fourth corner portion 34D (34) that connects the lower surface 18 and the rear surface 22B of the beam member 8. Each of the first corner portion 34A, the second corner portion 34B, the third corner portion 34C, and the fourth corner portion 34D is a flat, non-curved surface that does not form an uneven surface.

With the configurations illustrated in FIGS. 6 and 7, since the corner portion 34 of the beam member 8 is chamfered, when tidal currents or ocean currents collide with the front surface 22A or the rear surface 22B of the beam member 8, the tidal currents or ocean currents are smoothly guided upward or downward of the beam member 8. Thus, it is possible to reduce the drag force generated in the beam member 8 due to the influence of tidal currents and ocean currents.

Figure 8:
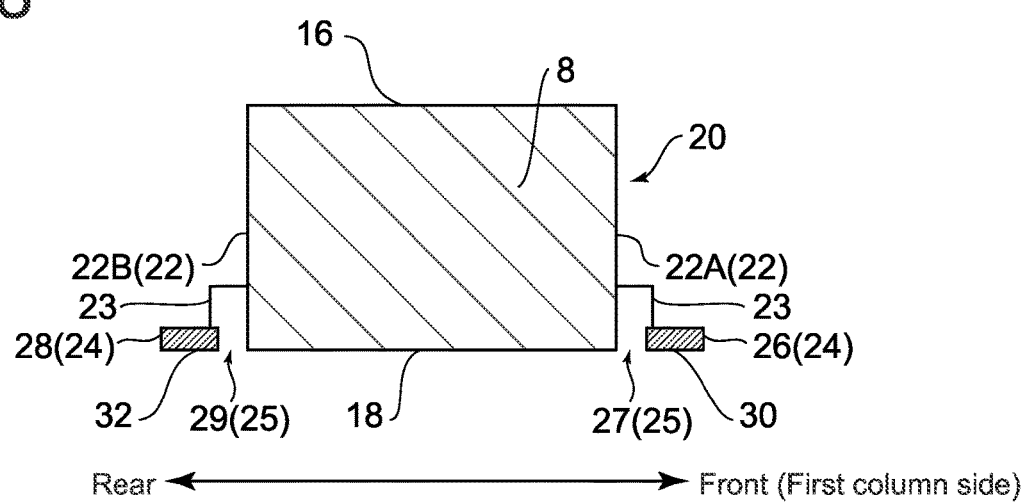
FIG. 8 is a diagram for describing a plate member according to an embodiment.

FIG. 8 is a diagram for describing a plate member 24 according to an embodiment. The floating body 1 may further include a plate member 24 having a plate shape. As shown in FIG. 8, the plate member 24 is disposed so as to form a gap 25 between the plate member 24 and the side surface 22 of the beam member 8 via a stay 23. More specifically, the plate member 24 includes a first plate member 26 (24) disposed so as to form a first gap 27 (25) with the front surface 22A (22) of the beam member 8, and a second plate member 28 (24) disposed so as to form a second gap 29 (25) with the rear surface 22B (22) of the beam member 8. The first plate member 26 is arranged to protrude forward from the beam member 8. The lower surface 30 of the first plate member 26 is located at the height of the lower surface 18 of the beam member 8. The second plate member 28 is arranged to protrude rearward from the beam member 8. The lower surface 32 of the second plate member 28 is located at the height of the lower surface 18 of the beam member 8.

With the configuration illustrated in FIG. 8, when seawater flows through the gap 25 between the plate member 24 and the beam member 8, the flow of seawater is disturbed, and a vortex is formed. Further, since the lower surface of the plate member 24 is located at the height of the lower surface 18 of the beam member 8, the seawater flowing through the gap 25 is further disturbed by both the side surface 22 and the lower surface 18 of the beam member 8, and the vortex formation is promoted. Since the vortex formation consumes kinetic energy of seawater (waves), the installation of the plate member 24 reduces the kinetic energy received by the beam member 8 from the waves. Thus, the oscillation of the beam member 8 can be suppressed with a simple configuration with the plate member 24.

Figure 9:
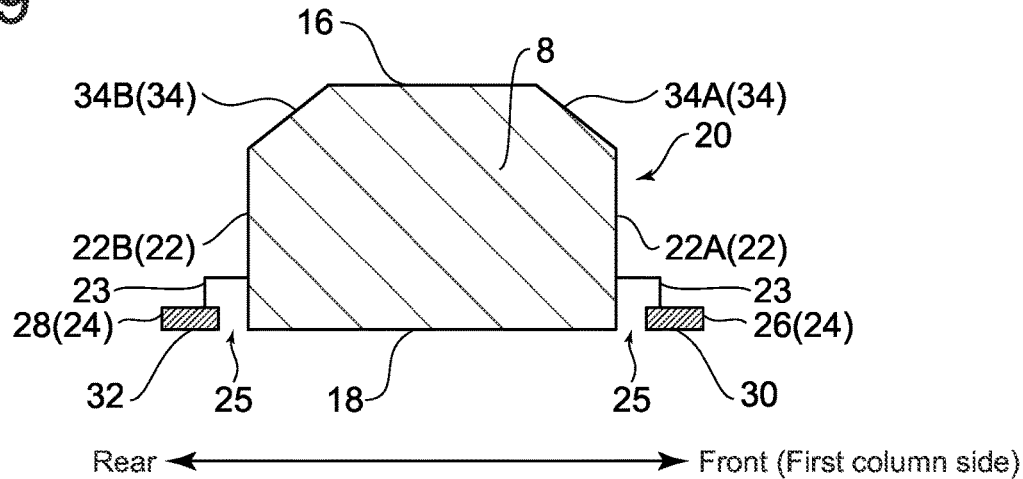
FIG. 9 is a diagram for describing a plate member according to an embodiment.
Figure 10:
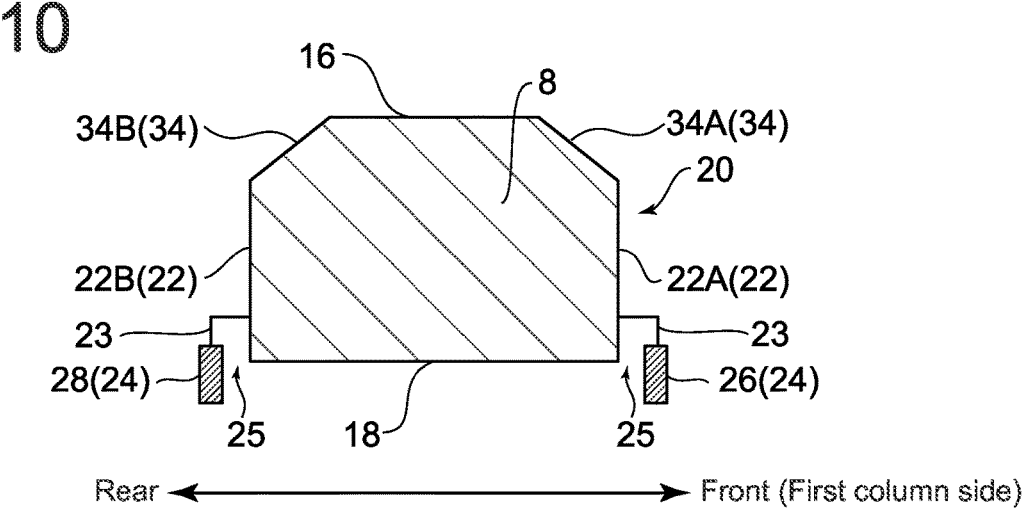
FIG. 10 is a diagram for describing a plate member according to an embodiment.
Figure 11:
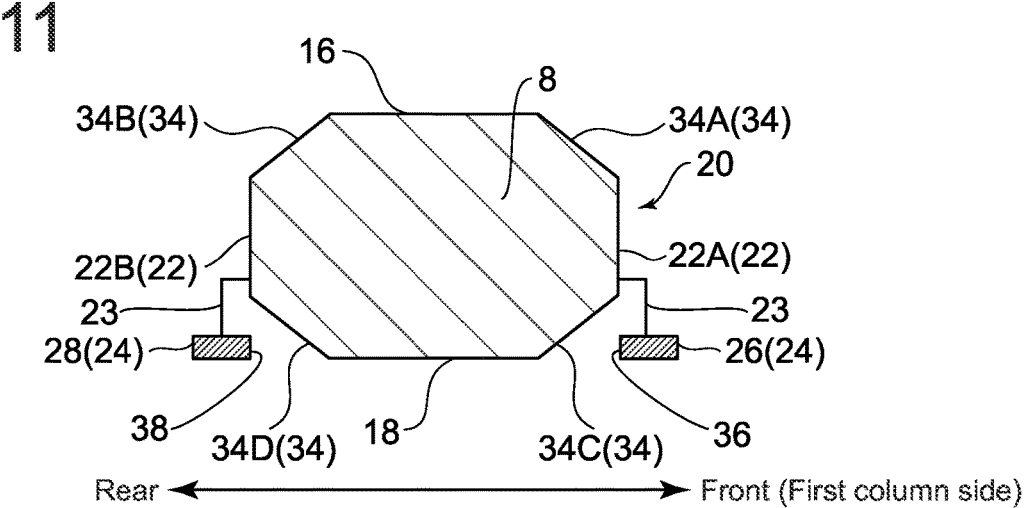
FIG. 11 is a diagram for describing a plate member according to an embodiment.

The arrangement of the plate member 24 is not limited to the example shown in FIG. 8. FIGS. 9 to 11 are diagrams for describing the plate member 24 according to an embodiment.

As shown in FIGS. 9 to 11, in a cross-sectional view perpendicular to the extension direction of the beam member 8, the corner portion 34 of the beam member 8 may be chamfered. Further, the plate member 24 may be disposed so as to form a gap 25 between the plate member 24 and the side surface 22 of the beam member 8 via a stay 23. As shown in FIG. 10, the plate member 24 may be arranged to protrude downward below the height of the lower surface 18 of the beam member 8. Further, as shown in FIG. 11, the first plate member 26 may be arranged so that the rear surface 36 of the first plate member 26 and the front surface 22A of the beam member 8 are in the same position in the front-rear direction. At this time, the second plate member 28 is arranged so that the front surface 38 of the second plate member 28 and the rear surface 22B of the beam member 8 are in the same position in the front-rear direction.

In the present disclosure, the position of the connecting portion 33 connecting the beam member 8 to each lower hull 6 is not particularly limited, but as shown in FIG. 1, the connecting portion 33 may be located between a midpoint P of the side surface (surface at a side connected to the beam member 8) of each lower hull 6 in the longitudinal direction and the second column 4 (secondary column). With such a configuration, since the wind turbine power generating apparatus 50 is mounted on the first column 2 (primary column), the center of oscillation of the offshore wind turbine 100 as a whole is located relatively close to the first column 2 in plan view of the floating body 1. Thus, as described above, when the connecting portion 33 is located between the midpoint P of the lower hull 6 and the second column 4 (secondary column), the beam member 8 can be placed far enough away from the center of oscillation of the offshore wind turbine 100 as a whole, which increases the effect of reducing the oscillation by the beam member 8.

In the embodiment illustrated in FIG. 1, the wind turbine power generating apparatus 50 is mounted on the first column 2. In another embodiment, the first column 2 is a secondary column on which the wind turbine power generating apparatus 50 is not mounted, and the second column 4 is a primary column on which the wind turbine power generating apparatus 50 is mounted. In this case, the connecting portion 33 between the beam member 8 and each lower hull 6 may be located between the midpoint P of each lower hull 6 in the longitudinal direction and the first column 2 (secondary column).

Operation Effect

The operation and effect of the floating body 1 for the offshore wind turbine 100 according to an embodiment of the present disclosure will now be described. According to an embodiment, the beam member 8 connecting the two lower hulls 6 can reduce stress concentration on the first column 2 to which the two lower hulls 6 are connected and function as a reinforcing member. Further, since the beam member 8 is disposed within the height range H between the upper surface 12 and the lower surface 14 of each lower hull 6, as compared to the case where a part or the whole of the beam member 8 is disposed outside the height range H, the influence of tidal currents and ocean currents on the beam member 8 can be reduced. Accordingly, it is possible to provide the floating body 1 for the offshore wind turbine 100 including the beam member 8 capable of reducing a drag force generated by the influence of tidal currents and ocean currents while functioning as a reinforcing member.

In an embodiment, as shown in FIGS. 2 to 4, 12, and 13, a cross-section of the lower hull 6 perpendicular to the extension direction is of a polygon. In the embodiment illustrated in FIGS. 2 to 4, the cross-section of the lower hull 6 has a rectangular shape elongated in the horizontal direction. In the embodiment illustrated in FIG. 12, the cross-section of the lower hull 6 has a hexagonal shape. In the embodiment illustrated in FIG. 13, the cross-section of the lower hull 6 has an octagonal shape. According to the embodiments illustrated in FIGS. 2 to 4, 12, and 13, the lower hull 6 can be produced by preparing multiple flat panels and connecting (for example, automatically welding) the panels to each other. This facilitates the production of the lower hull 6 and reduces the cost.

Figure 15:
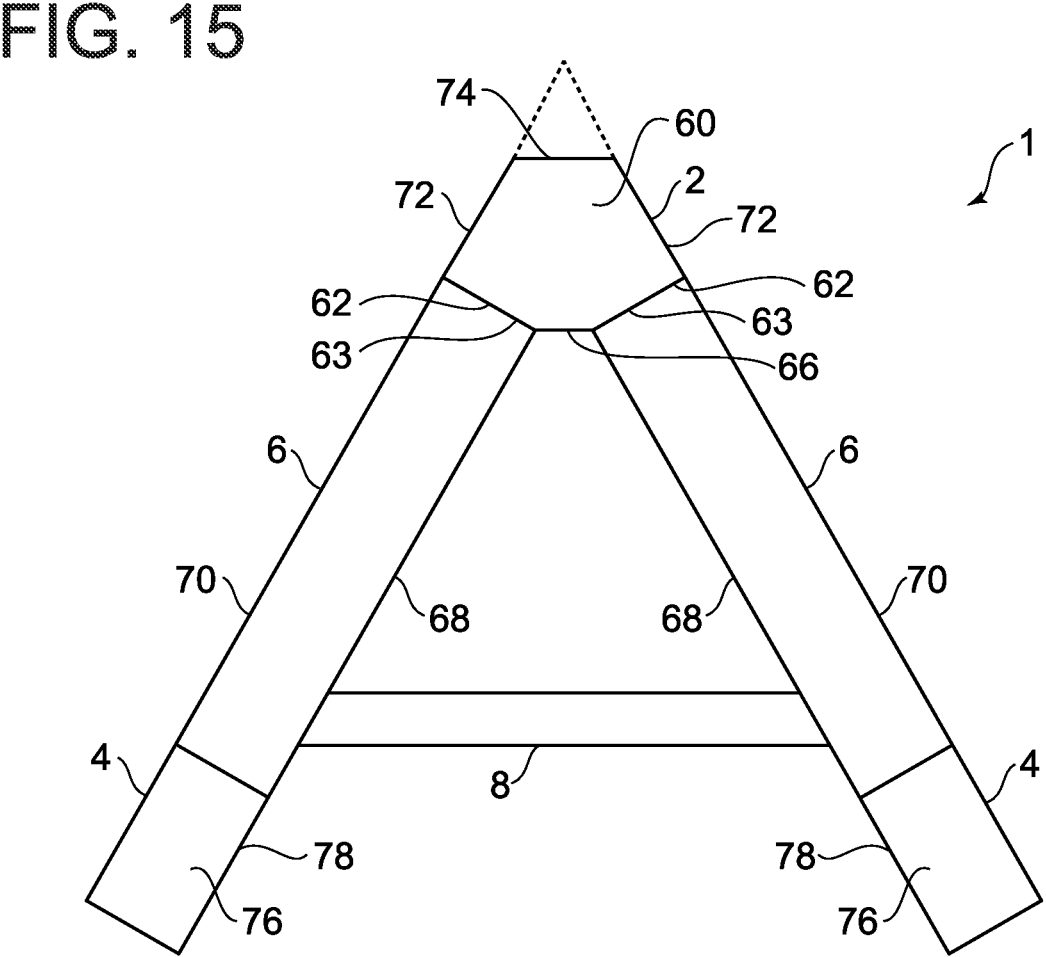
FIG. 15 is a schematic plan view of a floating body according to an embodiment.

FIG. 15 is a schematic plan view of the floating body 1 according to an embodiment. In an embodiment, as shown in FIG. 15, a first column cross-section 60 which is a cross-section of the first column 2 perpendicular to the extension direction is of a polygon. In the embodiment illustrated in FIG. 15, the first column cross-section 60 has a hexagonal shape. In an embodiment, as shown in FIG. 15, a second column cross-section 76 which is a cross-section of the second column 4 perpendicular to the extension direction is of a polygon. In the embodiment illustrated in FIG. 15, the second column cross-section 76 has a rectangular shape elongated in the extension direction of the lower hull 6. According to the embodiment illustrated in FIG. 15, each of the first column 2 and the second column 4 can be produced by multiple flat panels, which facilitates the production of the first column 2 and the second column 4 and reduces the cost.

In an embodiment, as shown in FIG. 15, the two lower hulls 6 are connected to two outer surfaces 63 of the first column 2 corresponding to two non-adjacent sides 62 of the polygon of the first column cross-section 60, respectively. That is, the connection points of the two lower hulls 6 to the first column 2 are two non-adjacent sides 62 of the polygon of the first column cross-section 60, respectively. In the embodiment illustrated in FIG. 15, the first column cross-section 60 includes one side 66 between the two sides 62. The connection points of the two lower hulls 6 to the first column 2 are areas where stress concentration is likely to occur. According to the embodiment illustrated in FIG. 15, since one outer surface of the first column 2 corresponding to the one side 66 is interposed between the two lower hulls 6, as compared to the case where the outer surface of the first column 2 is not interposed between the two lower hulls 6, it is possible to reduce the stress concentration on the connection points.

In an embodiment, as shown in FIG. 15, each of the two lower hulls 6 includes an inner side surface 68 to which either end of the beam member 8 is connected, and an outer side surface 70 opposite to the inner side surface 68. The inner side surface 68 of the lower hull 6 is located on the inner side of the floating body 1 in plan view. The outer side surface 70 of the lower hull 6 is located on the outer side of the floating body 1 in plan view. Further, the outer side surfaces 70 of the two lower hulls 6 extend on extensions of any two sides of the polygon of the first column cross-section 60, respectively. In the embodiment illustrated in FIG. 15, the outer side surface 70 of each of the two lower hulls 6 extends on the extension of a side 72 connected to the side 62 on the opposite side from the side 66. According to the embodiment illustrated in FIG. 15, the lower hull 6 is connected to the first column 2 such that the outer side surface 70 of the lower hull 6 is flat against the outer surface corresponding to the side 72 of the first column cross-section 60. This facilitates the production of the floating body 1 and reduces the cost, as compared to the case where the outer side surface 70 of the lower hull 6 is not flat against the outer surface corresponding to the side 72 of the first column cross-section 60.

In an embodiment, as shown in FIG. 15, the polygon of the first column cross-section 60 has one or more other sides 74 connecting the two sides 72 on opposite sides from the two lower hulls 6. The side 74 is on the opposite side of the side 62 from the lower hull 6 in the extension direction of the lower hull 6. In the embodiment illustrated in FIG. 15, the polygon of the first column cross-section 60 has one side 74. When the first column cross-section 60 does not have one or more other sides 74 connecting the two sides 72 on opposite sides from the two lower hulls 6, as indicated by the dashed line in FIG. 15, the first column cross-section 60 is tapered toward the opposite sides from the two lower hulls 6. Therefore, according to the embodiment illustrated in FIG. 15, as compared to the case where the first column cross-section 60 is tapered toward the opposite sides from the two lower hulls 6, the area of the first column cross-section 60 can be reduced, and the cost of the floating body 1 can be reduced.

In an embodiment, as shown in FIG. 15, the length of the long side 78 of the second column cross-section 76 is larger than the width dimension of the lower hull 6. The width direction of the lower hull 6 is a direction perpendicular to the extension direction of the lower hull 6. In order to increase the stability of the floating body 1 (to prevent the floating body 1 from overturning), it is desirable to set the distance between the first column 2 and the second column 4 to a certain value or more. According to the embodiment illustrated in FIG. 15, the lower hull 6 can have a shape elongated in the extension direction while the inner side surface 68 and the outer side surface 70 of the lower hull 6 are flat against the side surfaces corresponding to the two long sides 78 of the second column 4. This improves the stability of the floating body 1 by setting the distance between the first column 2 and the second column 4 to a certain value or more, as well as facilitates the production of the floating body 1 and reduces the cost by making the inner side surface 68 and the outer side surface 70 of the lower hull 6 flat against the two side surfaces of the second column 4, respectively.

Figure 16:
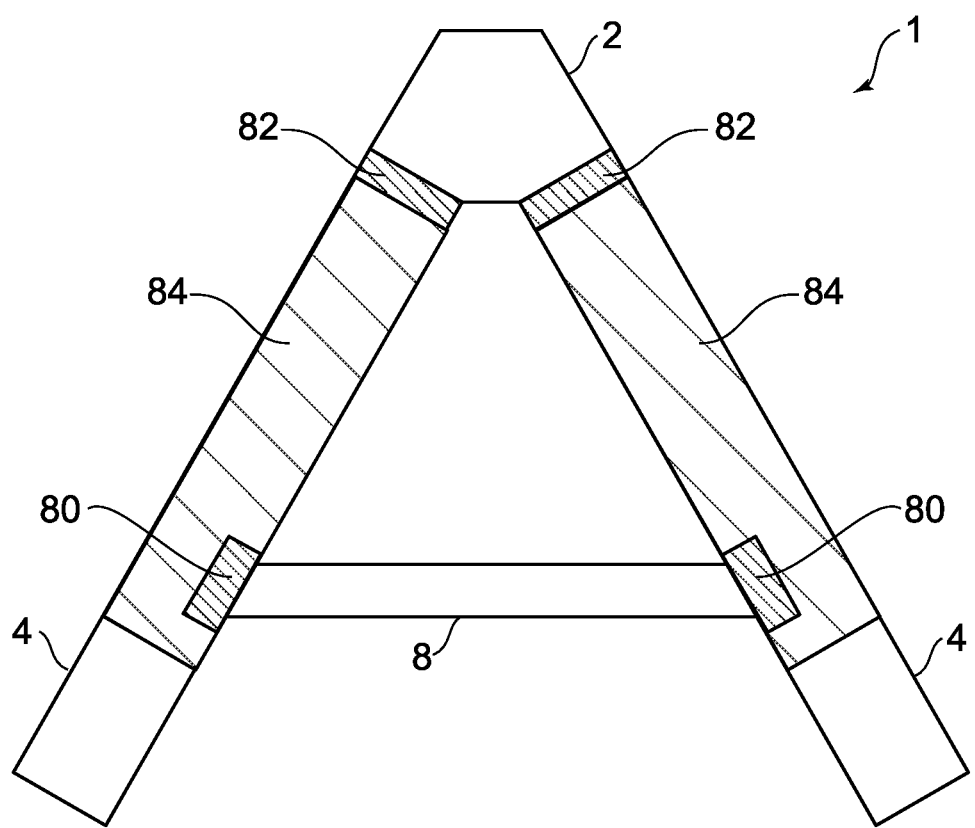
FIG. 16 is diagram showing the arrangement of a first void space and a second void space according to an embodiment.
Figure 17:
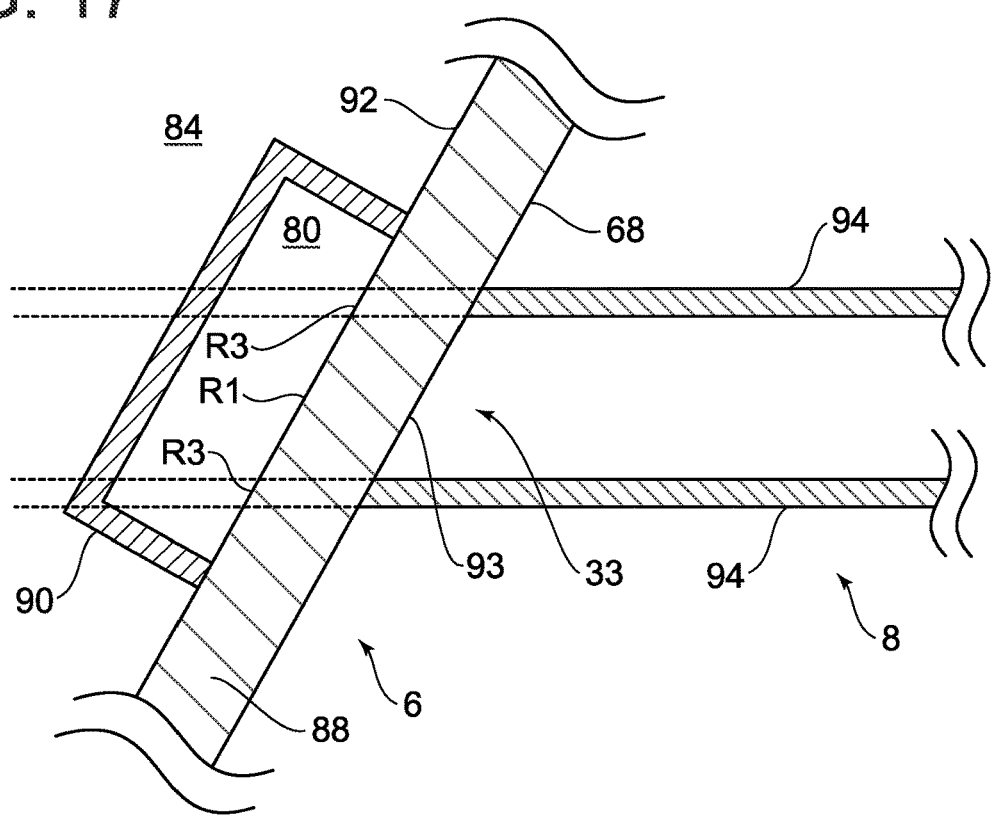
FIG. 17 is an enlarged view of the first void space of FIG. 16.
Figure 18:
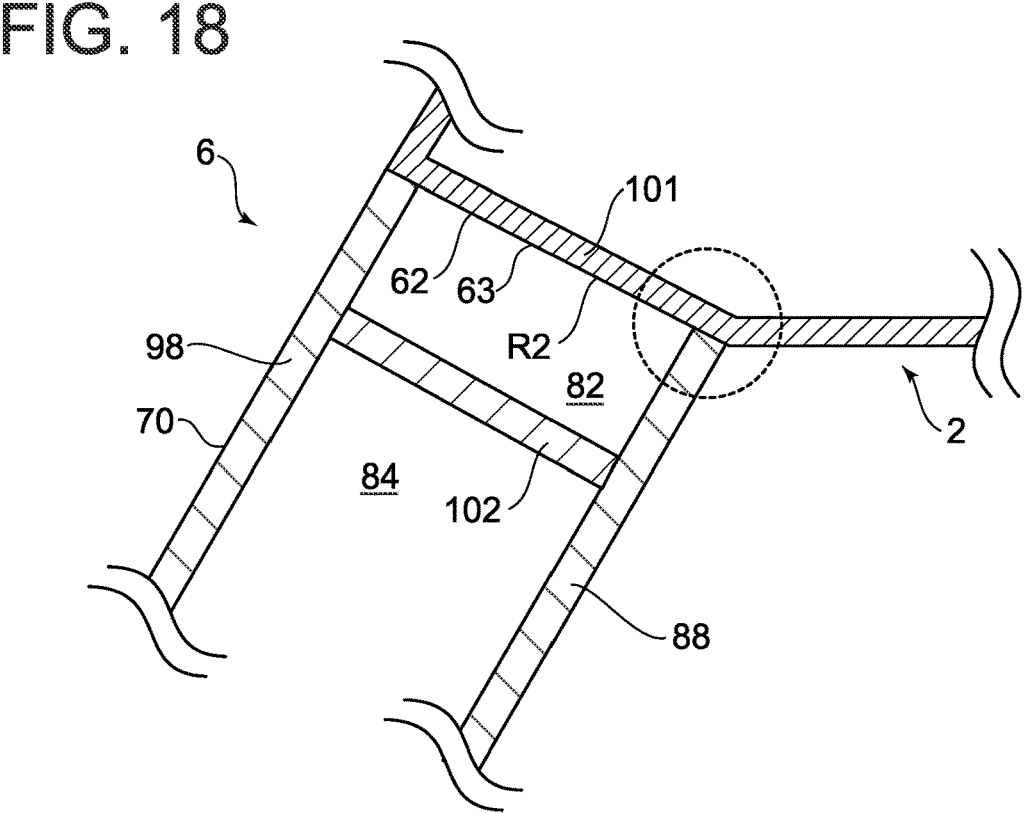
FIG. 18 is an enlarged view of the second void space of FIG. 16.

FIG. 16 is diagram showing the arrangement of a first void space 80 and a second void space 82 according to an embodiment. FIG. 17 is an enlarged view of the first void space 80 of FIG. 16. FIG. 18 is an enlarged view of the second void space 82 of FIG. 16. In the embodiment illustrated in FIG. 16, the lower hull 6 has both the first void space 80 and the second void space 82, but the present disclosure is not limited to this embodiment. In another embodiment, the lower hull 6 has either one of the first void space 80 or the second void space 82.

In an embodiment, as shown in FIG. 16, each lower hull 6 has a ballast space 84 capable of storing ballast water, and the first void space 80 formed separately from the ballast space 84. Further, as shown in FIG. 17, the first void space 80 faces a first connecting region R1 that faces the connecting portion 33 between the lower hull 6 and the beam member 8.

In the embodiment illustrated in FIG. 17, the first void space 80 is formed in the ballast space 84 by being enclosed by an inner panel wall 88, which constitutes the inner side surface 68 of the lower hull 6, and a first void wall 90, which is disposed on the opposite side of the inner panel wall 88 from the beam member 8. Thus, the first void space 80 is a space formed independently from the ballast space 84. The first connecting region R1 is a portion of an opposite surface 92 of the inner panel wall 88 opposite from the inner side surface 68 through which an imaginary tip end region obtained by extending the tip end 93 of the beam member 8 toward the inner panel wall 88 passes.

The first connecting region R1 is a region where stress tends to concentrate, and should be inspected periodically. When this first connecting region R1 is formed in the ballast space 84, it is necessary to discharge the ballast water for inspection of the first connecting region R1. According to the embodiments illustrated in FIGS. 16 and 17, since the first connecting region R1 is formed in the first void space 80, it is unnecessary to discharge the ballast water for inspection of the first connecting region R1, so it is possible to reduce the cost for inspection.

In the embodiment illustrated in FIG. 17, the first connecting region R1 faces the entire connecting portion 33, but the present disclosure is not limited to this embodiment. As illustrated in FIG. 17, the beam member 8 may include a surface member 94 constituting the surface of the beam member 8, and the tip end 93 of the beam member 8 may have an interior space when viewed in the extension direction. For example, the tip end 93 of the beam member 8 may have a ring shape when viewed in the extension direction. In some embodiments, the first void space 80 faces a third connecting region R3 of the opposite surface 92 of the inner panel wall 88 through which an imaginary tip end region obtained by extending the tip end of the surface member 94 toward the inner panel wall 88 passes. With such a configuration, it is possible to easily inspect the third connecting region R3 where stress tends to concentrate particularly.

In some embodiments, a sensor is provided within the first void space 80 to acquire the state of the connecting portion 33. The sensor may be, for example, a strain gauge, which is wired to a transmission facility disposed in the tower 54 and transmits information acquired from the sensor to the transmission facility. The transmission facility transmits the information acquired from the sensor to a monitoring device located away from the offshore wind turbine 100 using a communication cable or radio waves.

In an embodiment, as shown in FIG. 16, each lower hull 6 has the ballast space 84, and the second void space 82 formed separately from the ballast space 84 and the first void space 80. Further, as shown in FIG. 18, the second void space 82 faces a second connecting region R2 that faces a connecting portion between the lower hull 6 and the first column 2.

In the embodiment illustrated in FIG. 18, the second void space 82 is formed in the ballast space 84 by being enclosed by the inner panel wall 88, an outer panel wall 98, which constitutes the outer side surface 70 of the lower hull 6, an outer surface member 101, which constitutes the outer surface 63 of the first column 2 corresponding to the side 62, and a second void wall 102 having a surface facing the outer surface 63. Thus, the second void space 82 is a space formed independently from the ballast space 84. The second connecting region R2 is the entire outer surface 63 of the first column 2 corresponding to the side 62.

The second connecting region R2 is a region where stress tends to concentrate, and should be inspected periodically. When this second connecting region R2 is formed in the ballast space 84, it is necessary to discharge the ballast water for inspection of the second connecting region R2. According to the embodiments illustrated in FIGS. 16 and 18, since the second connecting region R2 is formed in the second void space 82, it is unnecessary to discharge the ballast water for inspection of the second connecting region R2, so it is possible to reduce the cost for inspection.

In the embodiment illustrated in FIG. 18, the second connecting region R2 faces the entire outer surface 63 of the first column 2 corresponding to the side 62, but the present disclosure is not limited to this embodiment. In some embodiments, the second void space 82 faces a corner portion (see FIG. 18, the portion surrounded by the dotted line) formed by the inner panel wall 88 of the lower hull 6 and the outer surface 63 of the first column 2 corresponding to the side 62. With such a configuration, it is possible to easily inspect the corner portion where stress tends to concentrate particularly.

In some embodiments, a sensor is provided within the second void space 82 to acquire the connection state between the first column 2 and the lower hull 6. The sensor may be, for example, a strain gauge, which is wired to a transmission facility disposed in the tower 54 and transmits information acquired from the sensor to the transmission facility. The transmission facility transmits the information acquired from the sensor to a monitoring device located away from the offshore wind turbine 100 using a communication cable or radio waves.

Figure 19:
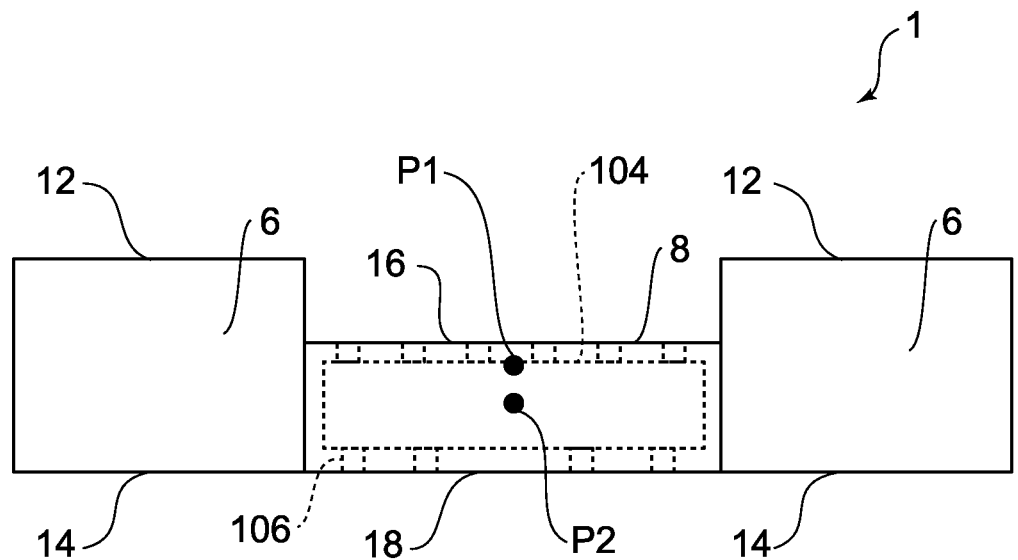
FIG. 19 is a schematic configuration diagram of a beam member according to an embodiment.
Figure 20:
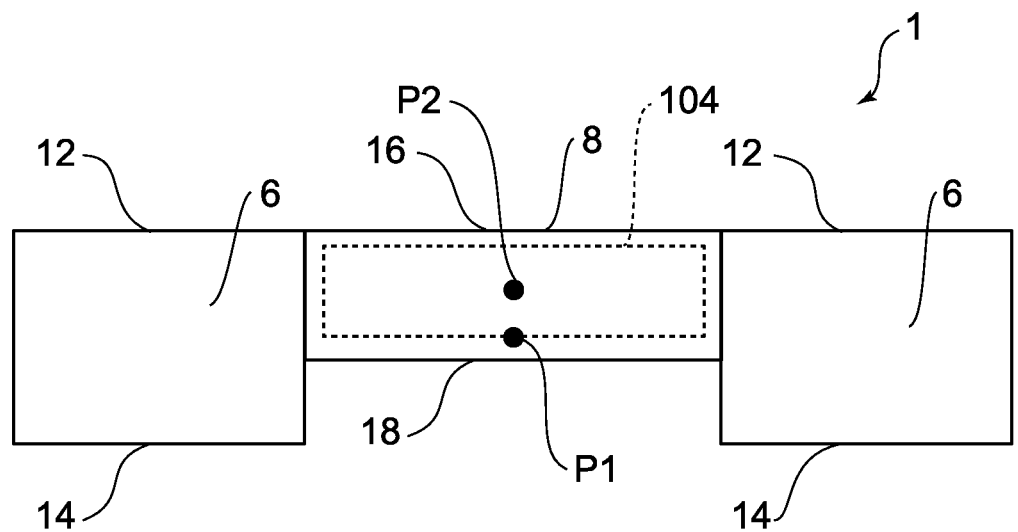
FIG. 20 is a schematic configuration diagram of a beam member according to an embodiment.

FIGS. 19 and 20 are schematic configuration diagrams of the beam member 8 according to an embodiment. The beam member 8 illustrated in FIG. 19 further limits the configuration of the beam member 8 illustrated in FIG. 3. Specifically, the lower surface 18 of the beam member 8 illustrated in FIG. 19 is located at the height of the lower surface 14 of the lower hull 6. The beam member 8 illustrated in FIG. 20 further limits the configuration of the beam member 8 illustrated in FIG. 2. Specifically, the upper surface 16 of the beam member 8 illustrated in FIG. 20 is located at the height of the upper surface 12 of the lower hull 6.

In an embodiment, as illustrated in FIG. 19, the beam member 8 is a hollow structure with a water-permeable interior space 104. Further, the beam member 8 has the center of volume P2 located below the center of buoyancy P1 of the floating body 1 excluding the beam member 8. In the embodiment illustrated in FIG. 19, communication holes 106 are formed in the upper surface 16 and the lower surface 18 of the beam member 8 to communicate the interior space 104 with the outside. The configuration (e.g., the position and number) of the communication holes 106 is not limited to the example shown in FIG. 19.

According to the embodiment illustrated in FIG. 19, in the case where the center of volume P2 of the beam member 8 is located below the center of buoyancy P1 of the floating body 1 excluding the beam member 8, when the floating body 1 is floated on the water surface, the beam member 8 with water flowing into the interior space 104 has less buoyancy than the beam member 8 without water flowing into the interior space 104, so that the center of buoyancy P1 of the floating body 1 is raised. When the center of buoyancy P1 of the floating body 1 is raised, the position of the metacenter of the floating body 1 is raised, and the distance between the metacenter and the center of gravity of the floating body 1 is increased, so that the restoring force of the floating body 1 can be increased.

In an embodiment, as illustrated in FIG. 20, the beam member 8 is a hollow structure with a watertight interior space 104. Further, the beam member 8 has the center of volume P2 located above the center of buoyancy P1 of the floating body 1 excluding the beam member 8.

According to the embodiment illustrated in FIG. 20, in the case where the center of volume P2 of the beam member 8 is located above the center of buoyancy P1 of the floating body 1 excluding the beam member 8, by forming the beam member 8 into a watertight hollow structure, the center of buoyancy P1 of the floating body 1 is raised when the floating body 1 is floated on the water surface. When the center of buoyancy P1 of the floating body 1 is raised, the position of the metacenter of the floating body 1 is raised, and the distance between the metacenter and the center of gravity of the floating body 1 is increased, so that the restoring force of the floating body 1 can be increased.

The contents described in the above embodiments would be understood as follows, for instance.

(1) A floating body (1) for an offshore wind turbine (100) according to the present disclosure includes: one first column (2); two second columns (4); two lower hulls (6) connecting the first column to each of the second columns; and a beam member (8) connecting the two lower hulls. The beam member is disposed within a height range between an upper surface (12) and a lower surface (14) of each lower hull.

With the above configuration (1), the beam member connecting the two lower hulls can reduce stress concentration on the first column to which the two lower hulls are connected and function as a reinforcing member. Further, since the beam member is disposed within the height range between the upper surface and the lower surface of each lower hull, as compared to the case where a part or the whole of the beam member is disposed outside the height range, the influence of tidal currents and ocean currents on the beam member can be reduced. Accordingly, it is possible to provide the floating body for the offshore wind turbine including the beam member capable of reducing a drag force generated by the influence of tidal currents and ocean currents while functioning as a reinforcing member.

(2) In some embodiments, in the above configuration (1), in a cross-sectional view perpendicular to an extension direction of the beam member, a width of the beam member is larger than a height of the beam member in at least part of the beam member.

With the above configuration (2), since the areas of the upper surface and the lower surface are increased in at least part of the beam member, when the beam member moves vertically, the resistance force received from a fluid (seawater) is increased. As a result, the vertical motion of the beam member is restricted, and it is possible to enhance the effect of reducing the oscillation of the floating body by the beam member.

(3) In some embodiments, in the above configuration (1) or (2), in a cross-sectional view perpendicular to an extension direction of the beam member, the beam member has a rectangular outer periphery (20).

With the above configuration (3), since the beam member has a rectangular outer periphery, when the beam member moves vertically, the resistance force received from a fluid (seawater) is increased. As a result, the vertical motion of the beam member is restricted, and it is possible to enhance the effect of reducing the oscillation of the floating body by the beam member.

(4) In some embodiments, in the above configuration (3), in a cross-sectional view perpendicular to an extension direction of the beam member, a corner portion (34) of the beam member is chamfered.

With the above configuration (4), when tidal currents or ocean currents collide with the side surface of the beam member, the tidal currents or ocean currents are smoothly guided upward or downward of the beam member. Thus, it is possible to reduce the drag force generated in the beam member due to the influence of tidal currents and ocean currents.

(5) In some embodiments, in any one of the above configurations (1) to (4), an upper surface (16) of the beam member is located at a height of the upper surface of each lower hull.

With the above configuration (5), the center of buoyancy of the floating body is raised, allowing the floating body to float on the sea in a more stable state.

(6) In some embodiments, in any one of the above configurations (1) to (5), a lower surface (18) of the beam member is located at a height of the lower surface of each lower hull.

With the above configuration (6), the beam member and the lower hull can be placed on the same plane when manufacturing the floating body. This eliminates the need to adjust the height of the beam member or the lower hull with a support material such as a board, thereby reducing the manufacturing cost of the floating body.

(7) In some embodiments, in any one of the above configurations (1) to (4), a lower surface of the beam member is located above the lower surface of each lower hull, and an upper surface of the beam member is located below the upper surface of each lower hull.

With the above configuration (7), the difference between the force from the lower hull to the upper surface of the beam member and the force from the lower hull to the lower surface of the beam member is reduced, and the dimension of the beam member is optimized.

(8) In some embodiments, in any one of the above configurations (1) to (7), one of the one first column or the two second columns is a primary column on which a wind turbine power generating apparatus (50) is mounted. The other of the one first column or the two second columns is a secondary column on which a wind turbine power generating apparatus is not mounted. A connecting portion (32) between the beam member and each lower hull is located between a midpoint of each lower hull in a longitudinal direction and the secondary column.

With the above configuration (8), since the wind turbine power generating apparatus is mounted on the primary column, the center of oscillation of the offshore wind turbine as a whole is located relatively close to the primary column in plan view of the floating body. Thus, as described above, when the connecting portion is located between the midpoint of the lower hull and the secondary column, the beam member can be placed far enough away from the center of oscillation of the offshore wind turbine as a whole, which increases the effect of reducing the oscillation of the floating body by the beam member.

(9) In some embodiments, in any one of the above configurations (1) to (8), the floating body further includes a plate member (24) having a plate shape. The plate member is disposed so as to form a gap between the plate member and a side surface (22) of the beam member.

With the above configuration (9), when a fluid (seawater) flows through the gap 25 between the plate member and the beam member, the flow of seawater is disturbed, and a vortex is formed. Since the vortex formation consumes kinetic energy of seawater (waves), the installation of the plate member reduces the kinetic energy received by the beam member from the waves. Thus, the oscillation of the beam member can be suppressed with a simple configuration with the plate member.

(10) In some embodiments, in the above configuration (9), a lower surface (30, 32) of the plate member is located at a height of a lower surface of the beam member.

With the above configuration (10), a fluid (seawater) flowing through the gap is further disturbed by both the side surface and the lower surface of the beam member, and the vortex formation is promoted. Therefore, it is possible to further reduce the oscillation of the beam member.

(11) In some embodiments, in any one of the above configurations (1) to (10), in a cross-sectional view perpendicular to an extension direction of each lower hull, a corner portion (15) of the lower hull is chamfered.

With the above configuration (11), when tidal currents or ocean currents collide with the side surface of the lower hull, the tidal currents or ocean currents are smoothly guided upward or downward of the lower hull. Thus, it is possible to reduce the drag force generated in the lower hull due to the influence of tidal currents and ocean currents.

(12) In some embodiments, in any one of the above configurations (1) to (11), in plan view, the one first column and the two second columns form each vertex of an imaginary isosceles triangle with the first column corresponding to an apex angle ($\theta 1$). The apex angle is 50 degrees or more and 70 degrees or less.

With the above configuration (12), the imaginary isosceles triangle formed by the one first column and the two second columns is an equilateral triangle or a triangle approximating an equilateral triangle. Therefore, it is possible to reduce the difference in the restoring force due to the difference in the tilting direction of the floating body, and to exhibit a stable restoring force.

(13) In some embodiments, in any one of the above configurations (1) to (12), at least one of a cross-section of the first column perpendicular to an extension direction of the first column, a cross-section of each second column perpendicular to an extension direction of the second column, and a cross-section of each lower hull perpendicular to an extension direction of the lower hull is of a polygon.

With the above configuration (13), the first column, the second column, or the lower hull can be produced by preparing multiple flat panels and connecting (for example, automatically welding) the panels to each other. This facilitates the production of the first column, the second column, or the lower hull and reduces the cost.

(14) In some embodiments, in the above configuration (13), a first column cross-section (60) which is the cross-section of the first column perpendicular to the extension direction is of a polygon. The two lower hulls are connected to two outer surfaces of the first column corresponding to two non-adjacent sides (62) of the polygon, respectively.

With the above configuration (14), since at least one outer surface of the first column is interposed between the two lower hulls, as compared to the case where the outer surface of the first column is not interposed between the two lower hulls, it is possible to reduce the stress concentration.

(15) In some embodiments, in the above configuration (13) or (14), a first column cross-section which is the cross-section of the first column perpendicular to the extension direction is of a polygon. Each of the two lower hulls includes an inner side surface (68) to which either end of the beam member is connected, and an outer side surface (70) opposite to the inner side surface. The outer side surfaces of the two lower hulls extend on extensions of any two sides (72) of the polygon, respectively.

With the above configuration (15), the lower hull is connected to the first column such that the outer side surface of the lower hull is flat against the first column cross-section.

This facilitates the production of the floating body and reduces the cost, as compared to the case where the outer side surface of the lower hull is not flat against the first column cross-section.

(16) In some embodiments, in the above configuration (15), the polygon has one or more other sides (74) connecting the two sides on opposite sides from the two lower hulls.

When the first column cross-section does not have one or more other sides connecting the two sides on opposite sides from the two lower hulls, the first column cross-section is tapered toward the opposite sides from the two lower hulls. With the above configuration (16), as compared to the case where the first column cross-section is tapered toward the opposite sides from the two lower hulls, the area of the first column cross-section can be reduced, and the cost of the floating body can be reduced.

(17) In some embodiments, in any one of the above configurations (13) to (16), a second column cross-section (76) which is the cross-section of each second column perpendicular to the extension direction is of a rectangle. A length of a long side of the second column cross-section is larger than a width dimension of each lower hull.

In order to increase the stability of the floating body (to prevent the floating body from overturning), it is desirable to set the distance between the first column and the second column to a certain value or more. With the above configuration (17), the lower hull can have a shape elongated in the extension direction while the side surfaces of the lower hull are flat against the side surfaces (long sides in plan view) of the second column. This improves the stability of the floating body by setting the distance between the first column and the second column to a certain value or more, as well as facilitates the production of the floating body and reduces the cost by making the side surfaces of the lower hull flat against the side surfaces of the second column, respectively.

(18) In some embodiments, in any one of the above configurations (1) to (17), each lower hull has: a ballast space (84) capable of storing ballast water; and a first void space (80) formed separately from the ballast space and facing a region (R1) that faces at least part of a connecting portion between the lower hull and the beam member.

The region (first connecting region) facing the connecting portion between the lower hull and the beam member is a region where stress tends to concentrate, and should be inspected periodically. When this first connecting region is formed in the ballast space, it is necessary to discharge the ballast water for inspection of the first connecting region. With the above configuration (18), since the first void space faces a region facing at least part of the connecting portion between the lower hull and the beam member, it is unnecessary to discharge the ballast water for inspection of this region, so it is possible to reduce the cost for inspection.

(19) In some embodiments, in any one of the above configurations (1) to (18), each lower hull has: a ballast space capable of storing ballast water; and a second void space (82) formed separately from the ballast space and facing a region (R2) that faces at least part of a connecting portion between the lower hull and the first column.

The region (second connecting region) facing the connecting portion between the lower hull and the first column is a region where stress tends to concentrate, and should be inspected periodically. When this second connecting region is formed in the ballast space, it is necessary to discharge the ballast water for inspection of the second connecting region. With the above configuration (19), since the second void space faces a region facing at least part of the connecting portion between the lower hull and the first column, it is unnecessary to discharge the ballast water for inspection of this region, so it is possible to reduce the cost for inspection.

(20) In some embodiments, in any one of the above configurations (1) to (19), the beam member is a hollow structure with a water-permeable interior space (104), and has a center of volume (P2) located below a center of buoyancy (P1) of the floating body excluding the beam member.

With the above configuration (20), in the case where the center of volume of the beam member is located below the center of buoyancy of the floating body excluding the beam member, when the floating body is floated on the water surface, water flows into the interior space of the beam member to reduce the buoyancy of the beam member, so that the center of buoyancy of the floating body is raised. When the center of buoyancy of the floating body is raised, the position of the metacenter of the floating body is raised, and the distance between the metacenter and the center of gravity of the floating body is increased, so that the restoring force of the floating body can be increased.

(21) In some embodiments, in any one of the above configurations (1) to (19), the beam member is a hollow structure with a watertight interior space, and has a center of volume located above a center of buoyancy of the floating body excluding the beam member.

With the above configuration (21), in the case where the center of volume of the beam member is located above the center of buoyancy of the floating body excluding the beam member, by forming the beam member into a watertight hollow structure, the center of buoyancy of the floating body is raised when the floating body is floated on the water surface. When the center of buoyancy of the floating body is raised, the position of the metacenter of the floating body is raised, and the distance between the metacenter and the center of gravity of the floating body is increased, so that the restoring force of the floating body can be increased.

REFERENCE SIGNS LIST

1 Floating body
2 First column
4 Second column
6 Lower hull
8 Beam member
12 Upper surface of lower hull
14 Lower surface of lower hull
15 Corner portion of lower hull
16 Upper surface of beam member
18 Lower surface of beam member
20 Outer periphery of beam member
22 Side surface of beam member
24 Plate member
25 Gap
30 Lower surface of first plate member
32 Lower surface of second plate member
33 Connecting portion
34 Corner portion of beam member
50 Wind turbine power generating apparatus
52 Nacelle
54 Tower
56 Rotor
58 Mooring line
68 Inner side surface of lower hull
70 Outer side surface of lower hull
80 First void space
82 Second void space 84 Ballast space
100 Offshore wind turbine
P1 Center of buoyancy
P2 Center of volume
R1 First connecting region
R2 Second connecting region

The invention claimed is:

1. A floating body for an offshore wind turbine, comprising:
one first column;
two second columns;
two lower hulls connecting the first column to each of the second columns; and
a beam member connecting the two lower hulls,
wherein the beam member is disposed within a height range between an upper surface and a lower surface of each lower hull, and
wherein a connecting portion between the beam member and each lower hull is located on the lower hull between a first connection position where the first column is connected and a second connection position where the second column is connected.

2. The floating body for an offshore wind turbine according to claim 1,
wherein, in a cross-sectional view perpendicular to an extension direction of the beam member, a width of the beam member is larger than a height of the beam member in at least part of the beam member.

3. The floating body for an offshore wind turbine according to claim 1,
wherein an upper surface of the beam member is located at a height of the upper surface of each lower hull.

4. The floating body for an offshore wind turbine according to claim 1,
wherein a lower surface of the beam member is located at a height of the lower surface of each lower hull.

5. The floating body for an offshore wind turbine according to claim 1,
wherein a lower surface of the beam member is located above the lower surface of each lower hull, and an upper surface of the beam member is located below the upper surface of each lower hull.

6. The floating body for an offshore wind turbine according to claim 1,
wherein, in a cross-sectional view perpendicular to an extension direction of each lower hull, a corner portion of the lower hull is chamfered.

7. The floating body for an offshore wind turbine according to claim 1,
wherein, in plan view, the one first column and the two second columns form each vertex of an imaginary isosceles triangle with the first column corresponding to an apex angle, and
wherein the apex angle is 50 degrees or more and 70 degrees or less.

8. The floating body for an offshore wind turbine according to claim 1,
wherein each lower hull has:
a ballast space capable of storing ballast water; and
a first void space formed separately from the ballast space and facing a region that faces at least part of a connecting portion between the lower hull and the beam member.

9. The floating body for an offshore wind turbine according to claim 1,
wherein each lower hull has:
a ballast space capable of storing ballast water; and
a second void space formed separately from the ballast space and facing a region that faces at least part of a connecting portion between the lower hull and the first column.

10. The floating body for an offshore wind turbine according to claim 1,
wherein the beam member is a hollow structure with a water-permeable interior space, and has a center of volume located below a center of buoyancy of the floating body excluding the beam member.

11. The floating body for an offshore wind turbine according to claim 1,
wherein the beam member is a hollow structure with a watertight interior space, and has a center of volume located above a center of buoyancy of the floating body excluding the beam member.

12. The floating body for an offshore wind turbine according to claim 1,
wherein a lower hull or a beam member connecting the two second columns to each other is not provided.

13. The floating body for an offshore wind turbine according to claim 1,
wherein at least one of a cross-section of the first column perpendicular to an extension direction of the first column, a cross-section of each second column perpendicular to an extension direction of the second column, and a cross-section of each lower hull perpendicular to an extension direction of the lower hull is of a polygon.

14. The floating body for an offshore wind turbine according to claim 13,
wherein a first column cross-section which is the cross-section of the first column perpendicular to the extension direction is of a polygon,
wherein each of the two lower hulls includes an inner side surface to which either end of the beam member is connected, and an outer side surface opposite to the inner side surface, and
wherein the outer side surfaces of the two lower hulls extend on extensions of any two sides of the polygon, respectively.

15. The floating body for an offshore wind turbine according to claim 14,
wherein the polygon has one or more other sides connecting the two sides on opposite sides from the two lower hulls.

16. The floating body for an offshore wind turbine according to claim 13,
wherein a first column cross-section which is the cross-section of the first column perpendicular to the extension direction is of a polygon, and
wherein the two lower hulls are connected to two outer surfaces of the first column corresponding to two non-adjacent sides of the polygon, respectively.

17. The floating body for an offshore wind turbine according to claim 13,
wherein a second column cross-section which is the cross-section of each second column perpendicular to the extension direction is of a rectangle, and
wherein a length of a long side of the second column cross-section is larger than a width dimension of each lower hull.

18. The floating body for an offshore wind turbine according to claim 1,
wherein, in a cross-sectional view perpendicular to an extension direction of the beam member, the beam member has a rectangular outer periphery.

19. The floating body for an offshore wind turbine according to claim 18,
wherein, in a cross-sectional view perpendicular to an extension direction of the beam member, a corner portion of the beam member is chamfered.

20. A floating body for an offshore wind turbine, comprising:
one first column;
two second columns;
two lower hulls connecting the first column to each of the second columns; and
a beam member connecting the two lower hulls,
wherein the beam member is disposed within a height range between an upper surface and a lower surface of each lower hull,
wherein one of the one first column or the two second columns is a primary column on which a wind turbine power generating apparatus is mounted,
wherein the other of the one first column or the two second columns is a secondary column on which a wind turbine power generating apparatus is not mounted, and
wherein a connecting portion between the beam member and each lower hull is located between a midpoint of each lower hull in a longitudinal direction and the secondary column.

21. A floating body for an offshore wind turbine, comprising:
one first column;
two second columns;
two lower hulls connecting the first column to each of the second columns; and
a beam member connecting the two lower hulls,
wherein the beam member is disposed within a height range between an upper surface and a lower surface of each lower hull,
wherein the plate member is disposed so as to form a gap between the plate member and a side surface of the beam member.

22. The floating body for an offshore wind turbine according to claim 21,
wherein a lower surface of the plate member is located at a height of a lower surface of the beam member.

* * * * *